United States Patent
Farr

[15] 3,696,317
[45] Oct. 3, 1972

[54] LOW CAPACITY, LOW PROFILE LOAD CELL

[72] Inventor: Emory W. Farr, Santa Fe Springs, Calif.

[73] Assignee: Waukesha Bearings Corporation, Waukesha, Wis.

[22] Filed: Aug. 19, 1970

[21] Appl. No.: 65,155

[52] U.S. Cl. .................................. 338/5, 73/141 A
[51] Int. Cl. .................................. G01l 1/22
[58] Field of Search ............. 338/2, 4, 5, 6; 73/141 A

[56] References Cited

UNITED STATES PATENTS

| | | |
|---|---|---|
| 3,196,676 | 7/1965 | Pieu ........................ 73/141 A |
| 3,427,875 | 2/1969 | Saxl ......................... 73/141 A |
| 3,413,845 | 12/1968 | Pugnaive ................. 73/141 A |

Primary Examiner—Benjamin A. Borchelt
Assistant Examiner—R. Kinberg
Attorney—Morsell & Morsell

[57] ABSTRACT

A sensing element, which includes a central core having four radially projecting webs with a bonded foil strain gauge on each web, is enclosed in a cylindrical case having an integral bottom with an annular ledge supporting the outer portions of the webs of the sensing element. The case is closed by a top diaphragm which centers a load-receiving button over the core of the sensing element.

5 Claims, 7 Drawing Figures

PATENTED OCT 3 1972  3,696,317
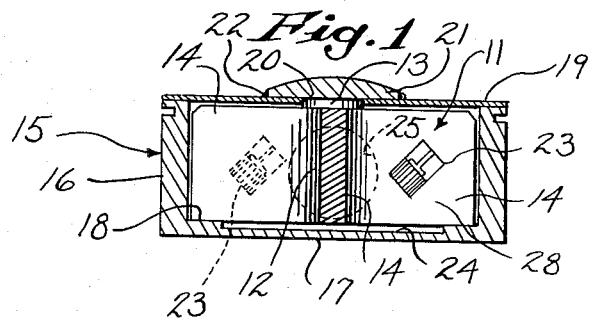
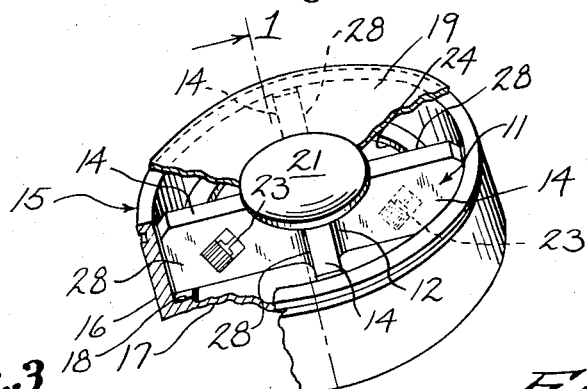
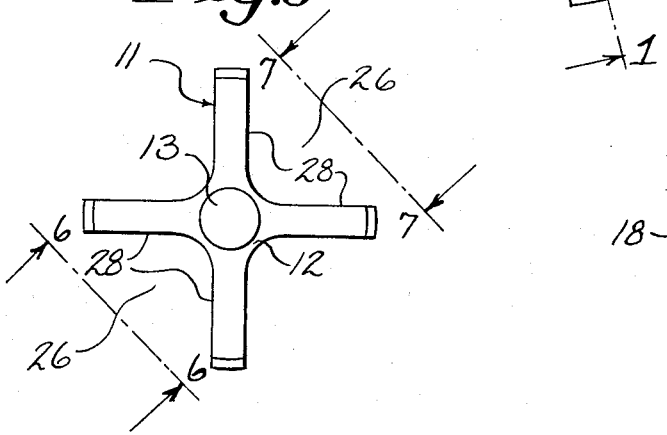
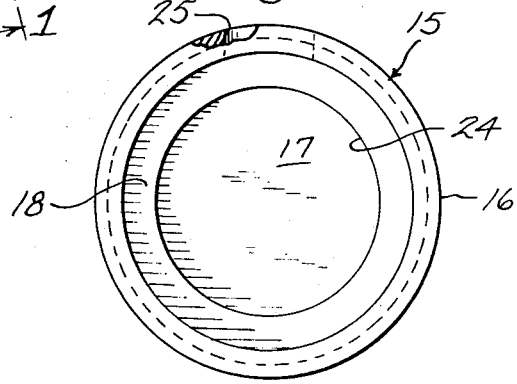
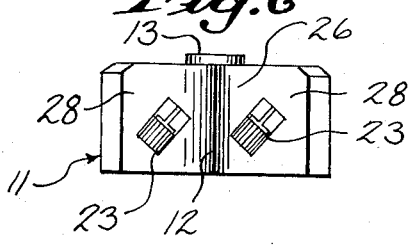
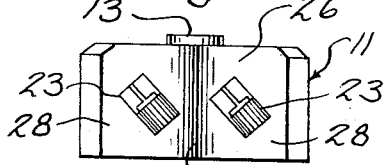
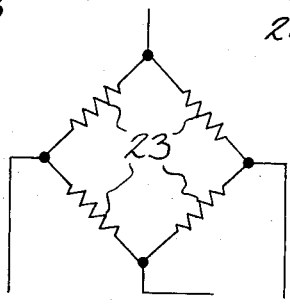
INVENTOR
EMORY W. FARR
BY Morsell & Morsell
ATTORNEYS

LOW CAPACITY, LOW PROFILE LOAD CELL

BACKGROUND OF THE INVENTION

1. Field of the Invention

The present invention pertains to low capacity, low profile load cells which employ the bonded foil strain gauge transduction principle, the gauges being interconnected into a Wheatstone bridge configuration and serving to measure tension and compression strains to which the cell is subjected.

2. Description of the Prior Art

Heretofore load cells which employ the bonded foil strain gauge transduction principle have been proposed and used, but problems have been encountered when it was attempted to make these prior cells of very small size with a low profile, for low capacity requirements, particularly in connection with the bonding and wiring of the strain gauges in position. A typical construction of the prior art is shown in U.S. Pat. No. 3,037,178, where the major portion of the load cell is a single solid member having an axially extending, central, load-receiving portion, and having an integral, outer, circular, load-supporting portion. The shear sensing structure is created by drilling axially extending, circumferentially spaced holes, and the strain gauges are bonded to the metal inside of the holes. Obviously, when an element of this type is below a certain size, it is not possible to insert and bond the strain gauges in such holes as the holes are too small.

Another device of the prior art is the Kutsay U.S. Pat. No. 3,365,689, wherein the principal portion of the load cell is a solid disk of metal having a central core to which the load is applied, and having an integral, outer, load-supporting portion in the form of a ring. Here radial holes are drilled into the solid metal and the strain gauges must be inserted in and properly bonded within the drilled holes. Here again, if the device is less than a certain minimum size, it is not possible to insert and bond the strain gauges. There are other strain gauges which employ multiple parts. However, all of these other strain gauges must be of a certain minimum size to make assembly practical and none of which applicant is aware can be manufactured with the low profile of the present invention.

SUMMARY OF THE INVENTION

The present invention provides a low capacity, low profile load cell employing the bonded foil strain gauge transduction principle wherein there is a sensing element with a central core having a plurality of radial webs, the element being preferably mounted in a specially formed outer case, and each web having a strain gauge bonded thereto, the novel arrangement permitting the insertion, bonding and wiring of the strain gauges under sub-assembly conditions, and providing sufficient clearance for the insertion and bonding of the strain gauges in a load cell of very small size with a low profile.

A general object of the invention is to provide a load cell which can be manufactured in smaller size for a given capacity than has heretofore been possible.

A further object of the invention is to provide a multi-part load cell wherein the sensing element is of open design to facilitate assembly operations.

A further object of the invention is to provide an improved load cell having a sensing element and an outer case wherein the plural part construction minimizes errors associated with mounting sensitivity.

A further object of the invention is to provide a load cell construction which provides a simple way of obtaining a diagonal stress path in a small size low profile element.

Other objects of the invention are to provide a load cell which is relatively inexpensive in construction, easy to assemble, efficient in operation, and well adapted for the purposes described.

BRIEF DESCRIPTION OF THE DRAWINGS

In the accompanying drawings, in which the same reference numerals designate the same parts in all of the views:

FIG. 1 is a vertical sectional view through the improved load cell, taken approximately on the line 1—1 of FIG. 2;

FIG. 2 is a perspective view of the load cell, parts being broken away to show the interior;

FIG. 3 is a top view of the sensing element;

FIG. 4 is a top view of the outer case alone;

FIG. 5 is a diagrammatic view showing the strain gauges connected into a Wheatstone bridge configuration;

FIG. 6 is an elevational view of the sensing element looking in the direction indicated by the line 6—6 in FIG. 3; and FIG. 7 is an elevational view of the sensing element looking in the direction indicated by the line 6—6 of FIG. 3.

DESCRIPTION OF THE PREFERRED EMBODIMENTS

Referring more particularly to the drawings, the numeral 11 designates a sensing element which is machined to provide a central core 12 with an integral top head or load-receiving end 13, and with a plurality, preferably four, of integral radially projecting web portions 14 which, when four are used, are approximately 90° apart. Inasmuch as the load-receiving end is on the top of the load cell there must be means on the opposite side or bottom for supporting the outer ends of the webs whereby intermediate portions of the webs have shear strains induced therein in response to a load applied to the load-receiving end 13 of the central core 12.

In the preferred embodiment illustrated a cylindrical case 15, also formed of suitable metal such as steel, is employed to house the sensing element and to furnish the desired support for the outer ends of the webs 14. In the preferred embodiment the sensing element is formed of suitable strain-responsive metal such as steel. The case is machined to provide a peripheral outer wall 16 with an integral base 17. The outer portion of the base is of increased thickness to provide an annular shoulder 18 on which the outer portions of the webs are adapted to rest in the assembly of FIG. 1. A metal diaphragm or cover 19 is welded at its outer edges to the upper edge of the case, and said diaphragm has a central opening 20 for receiving the head 13 of the sensing element core. A metal button 21 is welded to the diaphragm around its central opening as at 22. The diaphragm serves to center the button with respect to the sensing element and to environmentally seal the load cell.

The strain gauges 23 may be of a well known type, and preferably comprise foil arranged in the form of a grid and bonded to a paper or resin carrier, each strain gauge being bonded, preferably by means of a suitable adhesive such as an epoxy or connected by welding, to a radially extending, transverse face 28 of one of the webs 14 of the sensing element, as shown in FIGS. 1 and 2. It is preferred to have the gauges bonded in shear mode (45 degrees to the load axis as illustrated) in such a way as to measure tension and compression strains along axes of principal stress within the webs which is proportional to the applied load on the button 21. FIGS. 6 and 7 show a preferred arrangement of the strain gauges on the webs. The placement of the strain gauges may be varied to suit requirements.

Referring to FIG. 5, the four strain gauges are interconnected in the manner illustrated in a fully active Wheatstone bridge configuration, the Wheatstone bridge circuit being initially excited with an excitation voltage and balanced. When the strain gauges 23 are distorted, due to loads on the button 21, there is a change in the resistance, thereby unbalancing the bridge circuit. This distortion occurs because of the load applied to the button 21, which load is transferred through the webs 14 to the peripheral shelf 18 of the base and induces strains on the intermediate portions of the webs. As a result, the output voltage of the bridge varies proportionately with the load, and the change can be read on a suitable instrument as is well known in the art. The gauges may be connected to each other by suitable wires extending in the open spaces between webs and across the bottom recess 24 of the case and out through a radial opening 25 in the case to which suitable terminal connectors may be attached.

In manufacturing the novel load cell it is apparent that the multi-part construction, together with the open design of the sensing element 14, with the sector-shaped openings 26 between webs, make it possible to conveniently insert and bond the strain gauges on the webs in spite of the extremely small size and low profile of the device, and this assembly work may be done under sub-assembly conditions to achieve the precise location of the gauges on the webs as required. Thus much smaller size cells for a given capacity may be successfully manufactured. Changes in the load range of the cell within a given package size may be readily accomplished by changing the thickness of the material of the webs 14 in a horizontal direction. It is also apparent that with the multi-part construction the sensing element 11 is isolated from the outer case during manufacture so that assembly errors are minimized.

It is also obvious that the open design of the sensing element provides a simple way of accurately monitoring the diagonal stress path in a very small sized load cell. Load cells manufactured by this invention can be made as small as five-eighths of an inch in diameter. A size which is well-suited for certain requirements is 1½ inches in diameter and has a 4,500 pound capacity rating.

It is to be understood that I do not desire to be limited to the exact details of construction shown and described, for obvious modifications will occur to a person skilled in the art.

What I claim is:

1. In a load cell, a sensing element having a central core with a load-receiving end at one side of the load cell and having a plurality of radially projecting webs with radially extending surfaces disposed transversely of the load cell, means at the opposite side of the load cell supporting the outer ends of said webs whereby intermediate portions of the webs have shear strains induced therein in response to a load applied to said central core, a strain gauge bonded to a radially extending surface of each web, there being sector-shaped spaces between webs furnishing access to said radially extending strain gauge receiving surfaces of the webs during assembly, there being an outer case having a bottom, and said means for supporting the outer ends of the webs being raised ledge means on the bottom of the case on which the outer ends of the webs are seated to hold the remainder of the sensing element spaced above said bottom.

2. A load cell as claimed in claim 1 in which the entire bottom of the case is bordered by said ledge means.

3. A load cell as claimed in claim 1 in which the case is circular and in which the ledge means is circular.

4. A load cell as claimed in claim 1 in which there are four radially projecting webs which are equally spaced circumferentially, and in which there are four sector-shaped access spaces between webs.

5. In a load cell, a cup-shaped outer case of low height compared to its diameter and having a bottom and upright sides, a sensing element having a central core with a short load-receiving heat at the top and having a plurality of radially projecting webs with radially extending surfaces disposed transversely of the load cell, each web having upper, lower and outer end edges and being solid between said upper and lower edges, ledge means within the case adjacent the perimeter of said bottom thereof supporting the outer ends of said webs whereby intermediate portions of the lower edges of the webs are maintained close to, but spaced sufficiently above the bottom of the case so that shear strains are induced in the webs in response to a load applied to said head of the central core, a strain gauge bonded to a radially extending surface of each web, there being sector-shaped spaced between webs furnishing access to said radially extending strain gauge receiving surfaces of the webs during assembly, a diaphragm cover for said case, and means securing said head to the center of the diaphragm cover with the lower side of the diaphragm cover close to the upper edges of the webs, the outer periphery of the diaphragm being sealed to the rim of the case to maintain the sensing element in assembled position with the height of the web substantially filling the height of the case and with the outer ends close to the sides of the case.

* * * * *